United States Patent [19]

Kato

[11] Patent Number: 4,554,654

[45] Date of Patent: Nov. 19, 1985

[54] OPTICAL MEMORY DEVICE WITH MEANS FOR DETECTING ERRONEOUS DATA WRITING

[75] Inventor: Kiichi Kato, Tokyo, Japan

[73] Assignee: Olympus Optical Co. Ltd., Tokyo, Japan

[21] Appl. No.: 454,262

[22] Filed: Dec. 29, 1982

[30] Foreign Application Priority Data

Jan. 11, 1982 [JP] Japan ................................ 57-2494

[51] Int. Cl.$^4$ .......................... G11B 7/00; G11B 27/36
[52] U.S. Cl. ........................................ 369/54; 369/58; 369/106; 369/120
[58] Field of Search ....................... 369/44, 45, 46, 54, 369/58, 100, 106, 110, 116, 120

[56] References Cited

U.S. PATENT DOCUMENTS

| | | | |
|---|---|---|---|
| 4,030,835 | 6/1977 | Firester et al. | 369/58 |
| 4,163,149 | 7/1979 | Sawano et al. | 369/45 |
| 4,225,873 | 9/1980 | Winslow | 369/110 |
| 4,273,998 | 6/1981 | Kanamaru | 369/46 |
| 4,308,612 | 12/1981 | Miyauchi | 369/58 X |
| 4,355,318 | 10/1982 | Miyauchi | 369/54 |
| 4,426,693 | 1/1984 | Satoh et al. | 369/45 |

FOREIGN PATENT DOCUMENTS 55-15313  3/1980  Japan.

Primary Examiner—Raymond F. Cardillo, Jr.
Assistant Examiner—Alan K. Aldous
Attorney, Agent, or Firm—Frishauf, Holtz, Goodman & Woodward

[57] ABSTRACT

An optical memory device comprises a modulator for modulating a laser beam in accordance with recording data, an objective lens for focusing the output light beam from the modulator on a recording medium, a sensor arranged in the far field of the objective lens, and a judging circuit for detecting an erroneous writing operation in accordance with an output from the sensor and the recording data. The sensor has a square detecting surface divided into four segments by lines which form angles of ±45° with respect to the direction of relative movement between the recording medium and the focused light beam. The difference between the sums of outputs from two pairs of opposing segments is supplied to the judging circuit.

5 Claims, 10 Drawing Figures

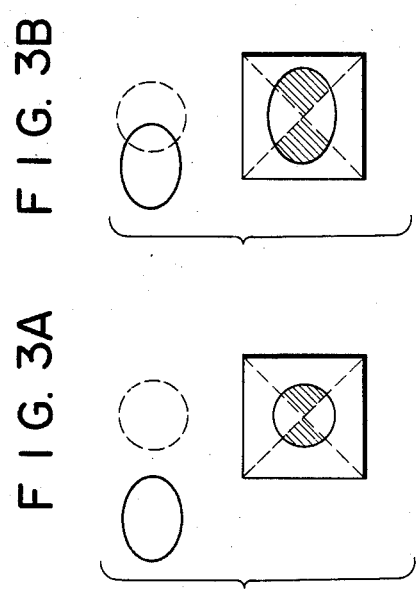
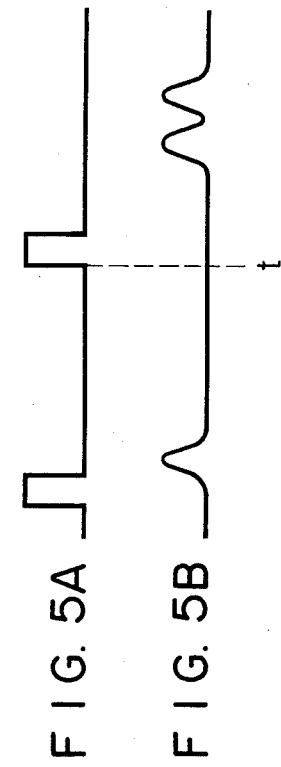
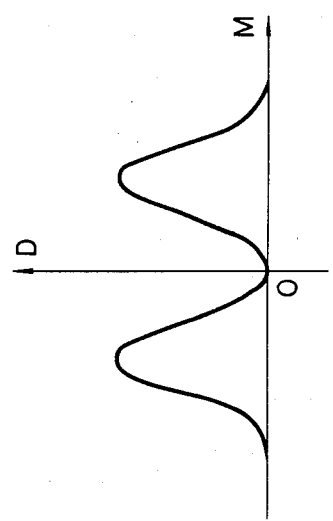
FIG. 3A  FIG. 3B  FIG. 3C  FIG. 3D  FIG. 3E
FIG. 4
FIG. 5A  FIG. 5B

OPTICAL MEMORY DEVICE WITH MEANS FOR DETECTING ERRONEOUS DATA WRITING

BACKGROUND OF THE INVENTION

The present invention relates to an optical memory device and, more particularly, to an optical memory device which is capable of detecting the erroneous writing of data.

In an optical memory device, rows of pits are formed on the surface of the optical disc in accordance with recording data so as to write data. Pits are formed by evaporating the photosensitive material on the surface of the optical disc with a laser beam. Therefore, if the pits are not formed correctly or if there is a scratch or the like on the surface of the optical disc, data is erroneously written. In order to prevent this, a judgment must be made as to whether or not data has been correctly written. Detection of erroneous writing is conventionally performed utilizing light from the laser beam reflected off the optical disc. When a pit is formed, the reflectivity of the surface of the optical disc is varied to cause a level difference between the reflected light before and after pit formation, thus enabling detection of the presence or absence of the pit. If the level of the reflected light after the pit is formed is not lower than that of the reflected light before the pit is formed, even if a pit has been formed at the corresponding portion, correct formation of the pit has failed. Furthermore, if the level of the reflected light after the pit is formed is lower than that of the reflected light before the pit is formed, even if a pit has not been formed, it is probable that there is a scratch or the like on the optical disc. The reliability of the recording data is judged in this manner.

However, since it takes a considerable period of time after the writing laser beam is radiated before a pit is actually formed, the beam is overlapped with only half the pit. The level difference is not enough to detect the erroneous writing. If the data writing speed is high, the overlap portion becomes small and judgment reliability is degraded even further.

SUMMARY OF THE INVENTION

It is an object of the present invention to provide an optical memory device which is simple in structure and which is capable of accurately detecting erroneous writing due to defects of a recording medium or unsatisfactory writing.

The above object of the present invention is realized by an optical memory device comprising a light source for radiating a light beam which is modulated in accordance with recording data, an objective lens for focusing the light beam radiated from the light source onto a recording medium, the recording medium being arranged within a focal plane of the objective lens, and the recording medium being moved relative to the focused light beam, a sensor which is arranged in a far field of the objective lens and which is divided into four segments by first and second dividing lines which extend symmetrically with respect to a direction of relative movement between the recording medium and the focused light beam, an operation circuit for calculating a difference between sums of outputs from two pairs of opposing ones of the segments of the sensor, and a judging circuit for detecting erroneous writing in accordance with an output from the operation circuit and the recording data.

BRIEF DESCRIPTION OF THE DRAWINGS

FIGS. 3A to 3E are representations showing changes in the sectional shape (spot shape) of the incident light on the detecting surface with changes in the positions of the writing laser beam and the pits;

FIG. 4 shows the waveform of an output signal from a differential amplifier in relation to movement of the optical disc; and FIGS. 5A and 5B show the waveforms of the write data and of an output signal from the differential amplifier.

DETAILED DESCRIPTION OF THE PREFERRED EMBODIMENT

Figure 1:
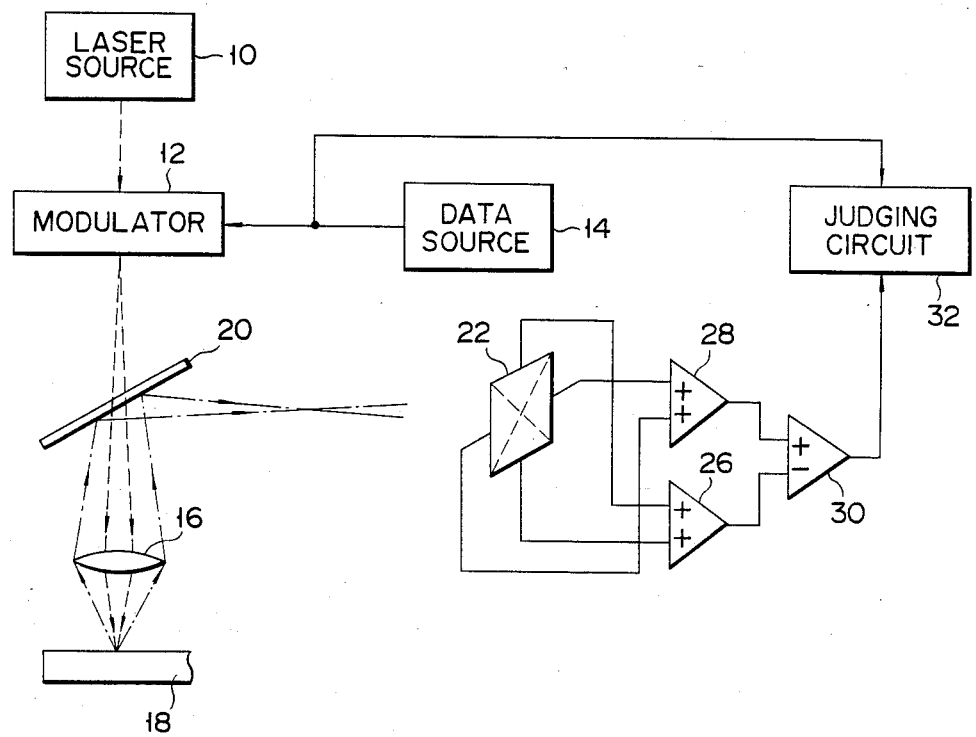
FIG. 1 is a block diagram of an optical memory device according to an embodiment of the present invention.
Figure 2:
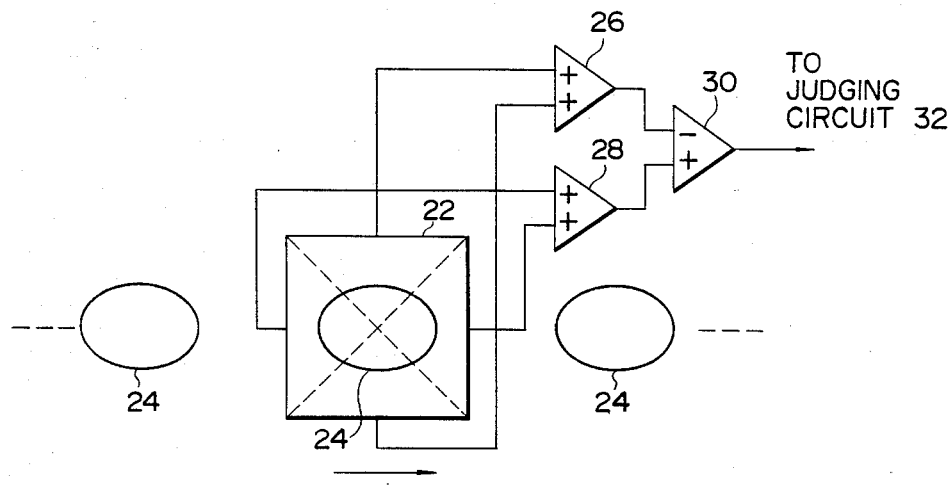
FIG. 2 is a representation showing the division of the sensor into segments.

An optical memory device according to an embodiment of the present invention will now be described in detail with reference to the accompanying drawings. FIG. 1 is a block diagram of the device. A laser beam radiated from a laser source 10 is amplitude-modulated in accordance with recording data from a data source 14 by a modulator 12. If a semiconductor laser is used as the laser source 10, it is not necessary to provide the modulator 12. Light (a writing laser beam) from the modulator 12 is focused on the surface of an optical disc 18 (the recording medium) by an objective lens 16. The optical disc 18 is in the focal plane of the objective lens 16. The optical disc 18 is rotating in the same manner as a normal magnetic disc, thus causing relative movement between the writing laser beam and the optical disc 18, i.e., scanning. The optical disc 18 is obtained by coating the surface of a plastic base film with a photosensitive, metal thin film. An incident laser beam evaporates the metal thin film to form a pit. A semitransparent mirror 20 is interposed between the modulator 12 and the objective lens 16. The semitransparent mirror 20 transmits light from the modulator 12 while it reflects the light from the objective lens 16 to deflect its optical path by 90°. A sensor 22 is arranged in the far field of the objective lens 16 in the optical path of the reflected light from the semitransparent mirror 20. The sensor 22 converts incident light into an electric signal. Since the optical disc 18 is rotating, the reflected light from a predetermined point on the optical disc 18 is moving on the detecting surface. The detecting surface of the sensor 22 is square in shape and is divided into four equal segments by two diagonal lines. FIG. 2 shows the relationship between the sensor 22 and a pit 24 formed on the optical disc 18. The pit 24 is formed along the direction of movement (indicated by the arrow) of the optical disc 18. The diagonal lines of the detecting surface are respectively inclined by 45° with respect to this direction of movement. Adders 26 and 28 calculate the sums of outputs from the pairs of opposing segments of the sensor 22. A subtractor 30 calculates the difference between the output signals from the adders 26 and 28. More specifically, the subtractor 30 subtracts the sum of the outputs of the vertically opposing segments of the sensor 22 from the sum of the outputs of the transversely opposing segments thereof. An output from the subtractor 30 and an output from the data source 14 are supplied to a judging circuit 32.

The mode of operation of the optical memory device of this embodiment will now be described. While the optical disc 18 is rotated, the recording data to be written are produced from the data source 14. The laser beam from the laser source 10 is amplitude-modulated to be a writing laser beam in accordance with the recording data. For example, when data "1" is to be written, the level of the laser beam is the sum of the pedestal level and a predetermined level. When data "0" is to be written, the level of the laser beam remains at the pedestal level. The writing of the data "1" corresponds to the formation of a pit, while the writing of the data "0" corresponds to the non-formation of the pit. While data is written on the optical disc 18 with the writing laser beam in this manner, the light of the writing beam reflected from the optical disc 18 is monitored by the sensor 22. The operation of judging erroneous writing will now be described. If the objective lens 16 is focused on the optical disc 18 and the intensity distribution of the writing laser beam is Gaussian distribution, the amplitude pattern A(X,Y), in the far field, of the reflected light from the optical disc 18 is given by $$A(X,Y) = \int_{-\infty}^{\infty}\int_{-\infty}^{\infty} a(x,y)\exp\{-2\pi i(xX + yY)/\lambda\}dxdy \quad (1)$$

$$\text{for } a(x,y) = \exp\{-(x^2 + y^2)\} \text{ Outside the pit} \atop = 0 \quad\quad\quad\quad\quad \text{Inside the pit} \quad (2)$$

Since the sensor 22 is arranged in the far field, the sectional shape of the reflected light beam from the detecting surface in relation to the positional relationship between the writing laser beam spot, i.e., the detecting surface and the pit may be obtained, from relations (1) and (2) above, as shown in FIGS. 3A to 3E. In FIGS. 3A to 3E, the positional relationship between the writing laser beam spot (circle indicated by broken line), i.e., the center of the detecting surface with the pit (ellipse indicated by the solid line) is shown in the upper portion, while the sectional shape of the reflected light beam on the detecting surface is shown in the lower portion. When the portion of the optical disc on which the pit is to be formed has not reached the writing laser beam spot, and when the pit has passed beyond the writing laser beam spot, the sectional shapes of the reflected light beam become circular, as shown in FIGS. 3A and 3E, respectively. When the pit is at the center of the writing laser beam spot, the sectional shape of the reflected light beam is a larger circle as shown in FIG. 3C than those shown in FIGS. 3A and 3E. When the pit overlaps the left and right sides of the writing laser beam spot, respectively, the sectional shapes of the reflected light beams become elliptical as shown in FIGS. 3B and 3D, respectively. Since outputs from the respective segments of the sensor 22 are processed by the adders 26 and 28 and the subtractor 30, a signal obtained by subtracting the outputs of non-hatched segments from the outputs of the hatched segments is produced from the subtractor 30. The optical disc 18 moves from the position shown in FIG. 3A toward the position shown in FIG. 3E. Therefore, an output signal D from the subtractor 30 considered in relation to one pit changes as shown in FIG. 4 with amount of movement M of the optical disc 18. M=0 corresponds to the state wherein the center of the detecting surface precisely coincides with the center of the pit. M<0 corresponds to the state wherein the center of the pit draws near the center of the sensor, as shown in FIGS. 3A and 3B. M>0 corresponds to the state wherein the pit draws away from the sensor, as shown in FIGS. 3D and 3E. An output from the subtractor 30 is 0 if the sectional shape of the reflected light beam on the detecting surface is a circle, and is a positive value if the sectional shape is elliptical.

Since the square detecting surface of the sensor 22 arranged in the far field of the objective lens 16 is divided into four equal segments by the two lines which form angles of ±45° with the direction of movement of the optical disc 18, formation of the pit can be confirmed in accordance with the waveform of the difference signal of the sums of the outputs from each pair of opposing segments. Accordingly, by comparing an output signal from the data source 14 with an output signal from the subtractor 30, the judging circuit 32 can detect the defective formation of a pit or a scratch on the optical disc. The timing at which a pit is completely formed is delayed from the timing of the radiation of the writing laser beam and the writing laser beam is overlapped with half the pit. For this reason, during the writing operation of the data "1", the latter half (M>0) of the waveform shown in FIG. 4 is produced from the subtractor 30. FIGS. 5A and 5B show the relationship between the output waveform of the data source 14 and the output waveform of the subtractor 30. Until time t, the subtractor 30 produces a signal having a waveform corresponding to the latter half of the waveform shown in FIG. 4 and a signal of logic level "0", in accordance with data "1" or "0". Therefore, the judging circuit 32 judges that normal writing is being performed. However, after time t, a signal of logic level "0" is generated in correspondence with data "1". Therefore, the judging circuit 32 judges that formation of the pit has failed. Furthermore, since a signal having the waveform shown in FIG. 4 is produced in correspondence with data "0", the judging circuit 32 judges that there is a scratch or the like on the optical disc 18 and the scratch has been erroneously read out as a pit.

According to the embodiment described above, since a differential output is utilized for judgement, judgement reliability is not subject to changes in the output from the laser source, i.e., changes in the intensity of the writing laser beam. Furthermore, since the differential output has a maximum amplitude when the centers of the sensor 22 and the pit 24 deviate from each other, the timing of formation of a pit may be delayed from the timing of radiation of the writing laser beam. This allows reliable judgement at a higher writing speed than with conventional devices.

In the embodiment described above, the detecting surface is square and is divided into four equal segments by diagonal lines, i.e., the lines which form angles of ±45° with the direction of movement of the optical disc. However, the detecting surface need not be divided by the lines which form angles of ±45°. That is, the detecting surface may be rectangular and may be divided by the diagonal lines. If the segments are not equally divided, D does not become 0 when M=0 in the waveform shown in FIG. 4, but two peaks are obtained. Thus, dividing lines which are symmetrical with respect to the direction of movement of the optical disc need only be selected. Furthermore, the dividing lines are not limited to straight lines.

In summary, the present invention provides an optical memory device which is simple in construction and which is capable of detecting the erroneous writing of data with excellent reliability and response time.

What is claimed is:

1. An optical memory device comprising:
   a single light beam radiating means for radiating a single recording light beam which is modulated in accordance with recording data;
   objective lens means for focusing said recording light beam from said single radiating means onto a recording medium, said recording medium being arranged within a focal plane of said objective lens means, and said recording medium and a focused light beam moving relative to each other;
   sensing means for sensing said recording light beam which is focused onto said recording medium and reflected therefrom, said sensing means being arranged in a far field of said objective lens means and being divided into four segments by first and second lines which are symmetrical with respect to a direction of relative movement between said recording medium and said focused recording light beam, said sensing means producing outputs corresponding to the light sensed by said segments of said sensing means;
   operating means for calculating a difference between sums of outputs from two pairs of opposing ones of said segments of said sensing means; and
   judging means for detecting an erroneous writing operation in accordance with an output from said operating means and said recording data.

2. A device according to claim 1, wherein said sensing means has a square detecting surface divided by lines which form angles of $\pm 45°$ with the direction of relative movement between said recording medium and said focused light beam.

3. A device according to claim 1, comprising a semitransparent mirror interposed between said single radiating means and said objective lens means so as to transmit light from said single radiating means and to reflect light from said objective lens means to change an optical path thereof by an angle of 90°, reflected light from said semitransparent mirror becoming incident on said sensing means.

4. A device according to claim 1, in which a pit is formed on said recording medium in accordance with said recording data, and said judging means judges erroneous writing if an output level from said operating means remains constant when said recording data indicates formation of the pit, and also judges erroneous writing if the output level from said operating means changes when the recording data indicates non-formation of the pit.

5. A device according to claim 1, wherein said single light beam radiating means comprises a single laser device for generating a single laser beam.

* * * * *